UNITED STATES PATENT OFFICE 2,267,148

METHOD OF MAKING ALUMINUM SOAPS

Charles J. Boner, Kansas City, Mo., assignor to Battenfeld Grease and Oil Corporation, Kansas City, Mo., a corporation of Missouri No Drawing. Application January 17, 1940,
Serial No. 314,241

8 Claims. (Cl. 260—414)

My invention relates to a method of making aluminum soaps.

Aluminum soaps are useful in making lubricating greases, in paint driers, and in waterproofing compounds.

The common method of making aluminum soaps commercially is by chemical interchange of a solution of an aluminum salt with a solution of an alkaline soap. The aluminum soap forms an insoluble precipitate which is recovered by filtering and washing.

In the prior art a typical method of making an aluminum soap by precipitation is to form an alkali soap by saponifying fat acids with an alkali, as, for example, sodium hydroxide. Into a warm aqueous solution of the sodium hydroxide soap a solution of an aluminum salt, as, for example, aluminum sulphate or aluminum acetate, is run. The aluminum soap separates as an insoluble precipitate and is separated by filtering. The precipitate is then washed to remove the soluble salts remaining. These salts are principally unreacted aluminum sulphate or acetate, as the case may be, and the sodium sulphate or acetate which is formed by the reaction.

In practice a portion of the water soluble salts can not be separated from the aluminum soap, and the presence of these soluble salts is detrimental in a grease. If it is attempted to refine the aluminum soap further, the product becomes so expensive that its use in commercial lubricants, for example, is almost prohibitive. Furthermore, ordinary filtration results in an aluminum soap containing about 60% of water. This water must be removed from the aluminum soap mass before it is marketable.

The foregoing commercial method is particularly disadvantageous in the confection of aluminum soaps for grease making. The presence of a soluble salt in the grease leads to difficulties and frequently makes the grease corrosive, especially to many modern bearing compounds.

Theoretically, it is possible to form aluminum soaps by reacting aluminum hydroxide with fat acids. This method is not used commercially, however, and cannot be used commercially because the reaction theoretically possible has not been commercially feasible. The same results are not always achieved, and frequently the reaction will not take place even though the temperature is elevated to a relatively high degree.

I have discovered that aluminum soaps may be made at room temperatures from gelatinous aluminum hydrate or aluminum hydroxide by direct reaction with fat acids in the presence of a catalyst. The reaction will not take place at room temperatures and is not commercially feasible without the presence of a catalyst.

One object of my invention is to provide a novel method for the confection of aluminum soaps.

Another object of my invention is to provide a method of making aluminum soaps from saponifiable organic acids at room temperatures by reaction with aluminum hydroxide.

A further object of my invention is to provide a method of making aluminum soaps free from soluble salts whereby the aluminum soaps are of superior value in the confection of lubricants.

In general, my invention contemplates the reaction of gelatinous aluminum hydrate with saponifiable organic acids in the presence of a catalyst to produce aluminum soaps. The gelatinous aluminum hydrate should preferably have a water content between 75% and 99%. The catalyst should be present in amounts from .01% to 2.0% by weight of the gelatinous aluminum hydrate on its wet weight. Any of the following alkalis may be used in my process: ammonium hydroxide; ammonium carbonate; potassium hydroxide; potassium carbonate; sodium carbonate; or sodium hydroxide. Without the free alkali catalyst, the aluminum hydrate will not react at low temperatures, and will react with difficulty producing uncertain yields and non-uniform results at elevated temperatures.

By means of the catalyst I am enabled to react fat acids with aluminum hydroxide at room temperatures, and even at lower temperatures. This is particularly advantageous for fat acids having a low titer, such as oleic and some of the synthetic, naphthenic and rosin acids. Any of the saponifiable organic acids may be used, such as the fatty acids, naphthenic acids, rosin acids and synthetic acids, or their derivatives such as obtained by hydrogenation or splitting.

The following example, which is given by way of illustration and not by way of limitation, is one method of carrying out my invention. To 100 pounds of fat acids produced by hydrogenating and splitting fish oil, 135 pounds of gelatinous aluminum hydrate was mixed at room temperature. The aluminum hydrate contained about 12% of aluminum oxide, dry basis, and 0.2% of sodium carbonate to act as a catalyst. The fact acids, and the gelatinous aluminum hydrate containing the catalyst were mixed in a small mixer similar to a dough mixer sometimes used in bakeries. The reaction will take place at room temperature. It can be accelerated by a mild heat. In the example given, the dough mixer was provided with a water jacket through which water at a temperature of 110° F. was circulated.

A putty-like mass is formed and most of the free water separates and can easily be decanted. The result is a mass of aluminum soap having no water soluble salts and a water content of approximately 20%. The mass can be dried in any desired manner as, for example, spreading on trays, in a tunnel drier, or by feeding through a rotary drier. It can be dried by simply fusing in a mixing kettle which is heated to above the boiling point of water. Any of the drying processes mentioned can, of course, be carried out under reduced pressure.

If desired a soap solvent can be added at this time and the drying continued. I have found that if a mineral oil is added at this time, it will displace a certain amount of water from the mass and permit the water to be drained off, thus reducing the drying time. I prefer to partially dry before adding the solvent as this accelerates the operation and reduces the possibility of hydrolysis of the aluminum soap.

It will be understood, of course, that any of the saponifiable organic acids or combinations of acids may be employed. Similarly, the amount of aluminum hydrate may be varied to obtain soaps of varying composition.

The soaps made by my process upon ashing will be found to have an aluminum oxide content varying from 6% to 20%.

It will be seen that I have accomplished the objects of my invention. I have provided a process for the confection of aluminum soaps by the direct reaction between gelatinous aluminum hydroxide and saponifiable organic acids, such as fat acids and the like, which reaction is promoted by means of a catalyst. The reaction may be carried out at room temperature if desired, and is accelerated by a slight increase in temperature. By means of my reaction, fat acids having a low titer may be used to form aluminum soaps.

The disadvantages of the now industrial method, namely, by chemical interchange of a solution of an aluminum salt with a solution of an alkaline soap, are avoided. The aluminum soaps formed by my process will be substantially free of water soluble salts. The catalyst, which is present in a minor amount, is soluble in the separated water and is removed with it so that the resulting aluminum soap is relatively free of impurities, thus forming a superior aluminum soap for use in the confection of greases.

It will be understood that certain features and subcombinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, I claim:

1. A method of making aluminum soaps including the steps of reacting aluminum hydrate with a saponifiable organic acid in the presence of an alkali catalyst selected from the class consisting of the hydroxides and carbonates of potassium, sodium and ammonia.

2. The method of making aluminum soaps including the steps of reacting gelatinous aluminum hydrate having a water content from 75% to 99% with a saponifiable organic acid in the presence of from .01% to 2.0% of an alkali catalyst selected from the class consisting of the hydroxides and carbonates of potassium, sodium and ammonia, said percentage of catalyst being measured with respect to the weight of the gelatinous aluminum hydrate.

3. A method as in claim 2 in which the saponifiable organic acid is a fatty acid.

4. A method as in claim 2 in which the saponifiable organic acid is a derivative of a fat acid.

5. A method as in claim 2 in which the saponifiable organic acid is a naphthenic acid.

6. A method of making an aluminum soap including the steps of reacting a fat acid with a gelatinous aluminum hydrate having a water content from 75% to 99% in the presence of an alkali catalyst selected from the class consisting of the hydroxides and carbonates of potassium, sodium and ammonia in the amount of from .01% to 2.0% by weight of the gelatinous aluminum hydrate, mechanically mixing the reactants and catalyst at elevated temperature, separating free water from the aluminum soap mass formed by the reaction, and then drying the aluminum soap.

7. A method as in claim 6 in which an aluminum soap solvent is added to the aluminum soap during the drying operation to partially displace water contained in the soap.

8. A method as in claim 6 in which the drying step is carried out at reduced pressure.

CHARLES J. BONER.